(12) United States Patent  
Schmid et al.

(10) Patent No.: US 6,336,879 B1  
(45) Date of Patent: Jan. 8, 2002

(54) TRANSMISSION

(75) Inventors: Jochen Schmid, Bühl-Neusatz; Oswald Friedmann, Lichtenau-Ulm, both of (DE)

(73) Assignee: LuK Getriebe-Systeme GmbH, Buhl/Baden (DE)

( * ) Notice: Subject to any disclaimer, the term of this patent is extended or adjusted under 35 U.S.C. 154(b) by 0 days.

(21) Appl. No.: 09/433,704

(22) Filed: Nov. 3, 1999

(30) Foreign Application Priority Data

Nov. 3, 1998 (DE) ......................................... 198 50 527

(51) Int. Cl.$^7$ ............................................. F16H 55/52
(52) U.S. Cl. ............................. 474/28; 474/18; 474/70
(58) Field of Search ............................. 474/8, 15, 18, 474/28, 46, 69, 70

(56) References Cited

U.S. PATENT DOCUMENTS

| | | | |
|---|---|---|---|
| 4,439,170 A | * 3/1984 | Steuer | 474/28 |
| 4,487,595 A | * 12/1984 | Quick et al. | 474/15 |
| 4,722,718 A | * 2/1988 | Eugen | 474/19 |
| 5,295,915 A | 3/1994 | Friedmann | |
| 5,667,448 A | 9/1997 | Friedmann | |
| 5,711,730 A | 1/1998 | Friedman et al. | |

FOREIGN PATENT DOCUMENTS

DE    42 34 294 A 1    4/1993

* cited by examiner

*Primary Examiner*—David A. Bucci  
*Assistant Examiner*—Vicky A. Johnson  
(74) *Attorney, Agent, or Firm*—Darby & Darby

(57) ABSTRACT

A continuously variable transmission with two adjustable pulleys and an endless torque-transmitting chain trained over the pulleys has a torque sensor which transmits variable torque from the rotary output element of a prime mover (such as the engine of a motor vehicle) to the axially movable flange of one of the pulleys. The torque sensor comprises one or more rolling elements and cam faces and/or guide surfaces which confine the rolling element(s) to movements radially and/or axially of the respective pulley. At least the rolling element(s) and those components of the torque sensor which define the cam faces and/or the guide surfaces of the torque sensor are confined in a fluid-containing plenum chamber adjacent the axially movable flange of the one pulley to thus achieve a pronounced reduction of space requirements of the unit including the one pulley and the torque sensor in the axial direction of the one pulley. The fluid in the plenum chamber serves to urge the axially movable flange of the one pulley against the adjacent edge face of the chain and to thus urge the other edge face of the chain against the axially fixed flange of the one pulley.

40 Claims, 3 Drawing Sheets

TRANSMISSION

BACKGROUND OF THE INVENTION

The invention relates to improvements in transmissions, and more particularly to improvements in transmissions which constitute or resemble so-called continuously variable transmissions (CVT). Still more particularly, the invention relates to improvements in apparatus which can be utilized to transmit variable torque in transmissions of the above outlined character and embody so-called torque sensors.

It is known to provide a continuously variable transmission with a mechanical or other suitable torque sensor which is (or can be) integrated into a pulley of the transmission. As a rule, the transmission comprises at least two pulleys which are mounted on discrete parallel shafts, and an endless flexible element (such as a belt or a chain) which is trained over the pulleys. Each pulley comprises a first conical flange which is rigidly affixed to (e.g., of one piece with) the respective shaft, and a second conical flange which is rotatable with the respective shaft and is movable axially of the shaft toward and away from the respective first flange. If the transmission comprises a torque sensor, such device serves to vary the pressure of a hydraulic fluid in at least one plenum chamber (which is adjacent the axially adjustable flange of one of the pulleys) as a function of variable torque being transmitted by the transmission.

The torque sensor can comprise rolling elements abutting cam faces provided on two components which are movable relative to each other; the rolling elements transmit torque which is being applied to the flanges of the corresponding pulley. The two components of the torque sensor move relative to each other (to thus influence fluid pressure in the at least one plenum chamber) in response to changes of the magnitude of torque being transmitted by the transmission and the resulting movements of the rolling elements along the cam faces.

A continuously variable transmission of the above outlined character is disclosed, for example, in published German patent application Serial No. 42 34 294 A1. This transmission comprises a torque sensor wherein one of the cam faces for the rolling elements (each of which is a sphere) is provided on a seal carrier; the latter is adjacent that side of an axially movable flange which faces away from the associated axially fixed flange of one of two pulleys forming part of the transmission. The seal carrier is adjacent and bounds a portion of a radially outer plenum chamber, namely the plenum chamber which confines the rolling elements of the torque sensor and contains a supply of fluid having a pressure corresponding to the torque being then transmitted by the transmission. The seal carrier further bounds a portion of a radially inner second plenum chamber. The pressure of fluid in the second plenum chamber is variable to thus select the ratio of the continuously variable transmission.

The other cam face for the rolling element or elements of the torque sensor disclosed in the aforementioned published German patent application is provided on a piston which is movable axially of the respective shaft and is outwardly adjacent the seal carrier (the latter is disposed between the piston and the axially movable flange of the respective pulley). The piston receives torque from a gear which mates with teeth provided on the piston. Axial movements of the piston result in controlled changes of the rate of fluid flow from a plenum chamber associated with that one of the aforementioned chambers which serves to determine the extent of frictional engagement between the flanges of the pulley and the adjacent surfaces of the endless flexible device (e.g., a chain).

In order to regulate the torque in dependency upon the selected transmission ratio, the rolling elements of the torque sensor are acted upon by an annular biasing member which urges them radially outwardly against the conical guide surface of a member which is rigidly secured to the axially movable flange of the respective pulley. The rolling elements are compelled to move radially inwardly and to roll along different portions of the properly configurated (three-dimensional) cam faces when the distance between the cam faces decreases.

A drawback of the aforedescribed continuously variable transmission is that the torque sensor and the mode of installing it in the transmission are quite complex and expensive. Thus, the number of discrete component parts is very high. Furthermore, the transmission is bulky, i.e., it occupies much room (as seen in the axial direction of its shafts) and a large number of its parts must be installed outside of the plenum chambers.

Another continuously variable transmission which embodies a torque sensor having spherical rolling elements between two cam faces in the form of ramps is disclosed in U.S. Pat. No. 5,295,915 granted Mar. 22, 1994 to Oswald Friedmann for "CONTINUOUSLY VARIABLE SPEED TRANSMISSION". U.S. Pat. No. 5,667,448 granted Sep. 16, 1997 to Oswald Friedmann for "POWER TRAIN" discloses a further continuously variable transmission, and a continuously variable transmission with a hydromechanical torque sensor is disclosed in U.S. Pat. No. 5,711,730 granted Jan. 27, 1998 to Oswald Friedmann et al. for "TORQUE MONITORING APPARATUS". The disclosures of the German priority application Serial No. 198 50 527.2 filed Nov. 3, 1998, of the aforementioned published German patent application Serial No. 42 34 294 A1, and of all other US and foreign patents and patent applications identified in the present application are incorporated herein by reference.

OBJECTS OF THE INVENTION

An object of the invention is to provide a continuously variable transmission which employs an integrated torque sensor and is more compact and comprises fewer parts (i.e., it is less expensive) than heretofore known transmissions.

Another object of the invention is to provide an apparatus which embodies a novel and improved torque sensor and can be installed in a continuously variable transmission to achieve savings in space, a reduction of the overall number of parts and other important savings and improvements.

A further object of the invention is to provide a continuously variable transmission with a novel and improved combination of parts which render it possible to take advantage of space that remains unoccupied in heretofore known continuously variable transmissions.

Still another object of the invention is to provide a novel and improved torque sensor which can be utilized in the power trains of motor vehicles or in other power trains which employ continuously variable transmissions.

A further object of the invention is to provide novel and improved pulleys for use in a transmission of the above outlined character.

Another object of the invention is to provide a motor vehicle wherein the power train embodies a continuously variable transmission of the above outlined character.

An additional object of the invention is to provide a continuously variable transmission wherein certain parts are capable of additional use in a motor vehicle or elsewhere.

SUMMARY OF THE INVENTION

One feature of the present invention resides in the provision of an apparatus which is constructed and assembled to transmit variable torque and comprises a shaft which is rotatable about a predetermined axis, a pulley including a first flange affixed to the shaft for axial and angular movements with the shaft and a second flange which is rotatable with the shaft but is movable relative to the shaft in the direction of the predetermined axis toward and away from the first flange, an endless flexible torque transmitting device (such as a chain or a belt) which is trained over the pulley, a fluid-containing plenum chamber at the second flange, and a torque sensor which is arranged to vary the pressure of fluid (such as oil) in the chamber in dependency upon the magnitude of the torque being transmitted by the improved apparatus. The torque sensor comprises first and second components having confronting cam faces (or analogous surfaces) and rolling elements disposed between the cam faces and serving to transmit torque which is being applied to the flanges. At least one of the aforementioned components of the torque sensor is movable relative to the other of these components in response to changes in the magnitude of transmitted torque. In accordance with an important and highly advantageous feature of the invention, the rolling elements and the cam faces are confined or disposed in the plenum chamber. This brings about substantial savings in space as considered in the axial direction of the pulley.

It will be seen that the torque sensor is or can be integrated into the pulley of the improved apparatus. The cam faces can be configurated in such a way that they effect a movement of the at least one component relative to the other component in response to rolling of the elements along at least one of the cam faces. The rolling elements can constitute spheres and the cam faces can extend in at least one of the directions including axially of the shaft and radialy of the axis.

The feature that the rolling elements are movable radially and/or axially of the shaft renders it possible to vary the pressure of fluid in the plenum chamber as a function of the torque being transmitted by the transmission as well as in dependency upon the speed ratio of the transmission, i.e., upon the axial distance between the flanges of the pulley.

The second flange can be provided with first and second guide surfaces which confine the rolling elements to movements radially of the axis of the pulley in response to movements of the second flange in the direction of the axis. Such construction and configuration of the second flange contribute to simplicity of the second flange and hence to greater simplicity of the entire pulley, i.e., to greater simplicity of the transmission (hereinafter also called CVT) which employs such pulley.

Alternatively, the first and second guide surfaces of the second flange can be designed to confine the rolling elements to movements in the direction of the axis of the pulley in response to movements of the second flange axially of the shaft. Such configuration of the second flange also cotributes to simplicity and reliability of the pulley and constitutes a presently preferred configuration of the second flange.

The second flange can comprise an annular portion having an external guide surface and extending in the direction of the axis of the shaft away from the first flange. Such apparatus can further comprise an annular member having an internal guide surface which surrounds the external guide surface. The guide surfaces flank the rolling elements and the annular member can be carried by the second flange. These just described features also contribute to simplicity, reliability, compactness and lower cost of the improved transmission.

The annular member can consist, at least in part, of a metallic sheet material (e.g., steel). Such annular member can be rigidly or rotatably connected to the second flange of the pulley.

The rolling elements can constitute spheres and the cam faces can be oriented to extend in at least one of the directions including axially of the shaft and radially of the axis of the shaft.

The other component of the torque sensor can include or constitute a carrier which is rigidly affixed to the shaft of the pulley and has a cylindrical external surface in sealing engagement with an annular member of the second flange. The shaft and the carrier bound at least a portion of the chamber and the at least one component of such torque sensor then comprises an annular piston which is movable in the plenum chamber in the direction of the axis of the pulley and is in sealing engagement with a cylindrical external surface of the carrier. An advantage of the just described embodiment is that it enhances the operativeness and the reliability of the improved transmission.

The just described embodiment of the apparatus can further comprise a first seal between the carrier and the annuar member at the cylindrical external surface and a second seal between the carrier of seals and the piston at the cylindrical internal surface of the carrier. The shaft and the piston preferably define a valve which serves to regulate the flow of fluid from the chamber as a function of the axial position of the piston relative to the shaft. The piston serves to take up an input torque of the apparatus and a presently preferred embodiment of the valve includes at least one outlet port which is provided in the shaft and communicates with the plenum chamber in at least one axial position of the piston relative to the shaft.

In accordance with a further modification, the piston comprises arms which are spaced apart from each other in a circumferential direction of the shaft and extend from the plenum chamber substantially radially outwardly and away from the axis of the pulley through openings which are provided in the aforementioned carrier of seals. Such apparatus preferably further comprises a gear having internal teeth mating with complementary external teeth of the arms; the gear is arranged to transmit torque to the piston and the piston is movable relative to the gear axially of the shaft of the pulley. The just described apparatus exhibits the advantage that it enhances the reliability of operation when the pressure of hydraulic fluid in the plenum chamber is relatively low or insufficient.

The openings can be dimensioned in such a way that the surfaces bounding the openings limit the extent of angular movability of the piston and the carrier relative to each other. More specifically, the surfaces bounding the openings limit the extent of movability of the arms (which are connected to the piston) and the carrier with respect to each other. The arms can contain or consist of a suitable metallic sheet material and can be welded or otherwise reliably bonded (e.g., soldered) to the piston. The arms and the gear can contain or consist of a metallic sheet material (e.g., sheet steel).

The carrier can comprise means for limiting the extent of movability of the piston relative to the shaft in the axial direction of the flange. Furthermore, the piston can be provided with an annular surface which is acted upon by the fluid in the plenum chamber adjacent the axially movable flange of the pulley and extends between the shaft and an annular internal extension or collar of the carrier (as seen radially of the axis of the pulley). To this end, the piston can be provided with a radially inner portion which sealingly engages the shaft and a radially outer portion which sealingly engages the carrer.

As already mentioned above, the first component of the torque sensor can comprise a piston which is installed in the plenum chamber and axially movably surrounds the shaft of the pulley. The piston is movable axially of the shaft of the pulley against the second flange in response to the application to the apparatus of an input torque in the absence of pressurized fluid in the chamber. The just described features of the improved apparatus contribute to lower cost of the pulley and they also enhance the simplicity and reliability of the transmission.

A further feature of the invention resides in the provision of a novel and improved variable-torque, variable speed ratio transmission. The latter comprises first and second adjustable rotary pulleys each having coaxial first and second flanges, an endless flexible torque transmitting device which is trained over the pulleys and is in force-transmitting engagement with the flanges, and means for adjusting at least one of the pulleys to select the magnitude of forces which act between the flanges of the at least one pulley and the endless flexible torque transmitting device as a function of the magnitude of transmitted torque. The adjusting means comprises a torque sensor having rolling elements and faces cooperating with the rolling elements to generate forces which vary in dependency upon variations of transmitted torque as well as upon variations of the speed ratio. The faces are configured and oriented to effect a movement of the rolling elements at least substantially radially of the axis of the at least one pulley in response to changes of the speed ratio. The torque sensor is or can be integrated into the at least one pulley. The aforementioned faces are provided on two discrete components, and such components are caused to move relative to each other in response to movements of the rolling elements along the respective faces. As already pointed ot before, the rolling elements and the faces are preferably provided in a plenum chamber wherein the fluid urges the flanges of the at least one pulley against the adjacent portions of edge faces of the endless flexible torque transmitting device.

The arrangement is normally such that the means for transmitting torque (for example, the engine of a motor vehicle) is arranged to transmit torque to the first pulley and that the means for receiving torque from such transmission is connected to the second pulley.

The rolling elements can constitute (and preferably are) spheres.

The aforementioned faces can be configured to effect a movement of the rolling elements substantially radially of the axis of the at least one pulley, as well as in the direction of such axis, in response to changes of the speed ratio.

Alternatively, the aforementioned faces can be provided on ramps which form part of the torque sensor, and the faces are inclined to provide for the rolling elements predetermined paths the inclination of which relative to the axis of the at least one pulley varies in the direction of movement of the rolling elements in response to changes of the speed ratio.

The rolling elements can include at least two spheres and the torque sensor can further comprise components defining for the two spheres two confronting grooves each of which has a substantially V-shaped configuration as seen in a direction radially of the axis of the at least one pulley. The components have contact surfaces which bound the grooves and are disposed at least substantially diametrically opposite each other. Each sphere is guided by a pair of contact surfaces which are at least substantially parallel to each other and tangential to the respective sphere, at least at a given radial distance from the axis of the at least one pulley.

The aforementioned faces can be arranged to transmit to the rolling elements forces each of which has at least one component acting radially of the axis of the at least one pulley. The arrangement is preferably such that the forces further have additional components acting in the axial direction of the at least one pulley. The magnitude of each at least one (radially acting) force component is or can be a relatively small (e.g., minute) fraction of the magnitude of a second component.

The engine or another suitable prime mover is preferably arranged to transmit torque to the at least one pulley (i.e., to the pulley which is combined with or embodies the torque sensor.

As a rule, the first flange of the at least one pulley is an axially fixed fange and the second flange of such pulley is then an axially movable flange. The torque sensor which is assocated with such pulley further includes a piston which is provided in a plenum chamber containing oil, transmission fluid or another hydraulic fluid and being adjacent the axially movable flange. The axially movable flange can be said to form part of a composite cylinder which defines the plenum chamber, and the piston is movable in the chamber in response to changes of the torque being transmitted by the torque sensor to thus select the magnitude of the force which the hydraulic fluid in the plenum chamber applies to the axially movable flange for transmission to the endless flexible torque transmitting device.

In the just outlined transmission wherein at least one pulley includes an axially fixed and an axially movable flange, the aforementioned faces are normally arranged to move the rolling elements substantially radially of and relative to the axially movable flange. The torque sensor of such transmission can but need not always further comprise cages for the rolling elements; if provided, the cages are movable along the guide faces for the rolling elements.

One of the faces can be provided on an at least partially conical carrier which is affixed to the axially movable flange of the at least one pulley, and such one face is or can be configurated to confine the rolling elements to movements at least substantially radially of the axis of the at least one pulley. The at least partially conical carrier can taper toward the axis of the at least one pulley in a direction away from the axially movable flange of the respective pulley.

In many instances, each of the pulleys comprises a rotary shaft (such shafts are normally parallel to each other); each first flange is normally rigid (e.g., of one piece) with the respective shaft, and each second flange is arraged to rotate with the respective shaft but is free to move axially of such shaft.

Still another feature of the present invention resides in the provision of a transmission (such as a CVT) having a plurality of speed ratios and comprising a first adjustable pulley which is rotatable about a first axis, a second adjustable pulley which is rotatable about a second axis (each pulley comprises a shaft defining the respective axis, a first flange which is rigid with the respective shaft, and a second flange which is arranged to rotate with and to move axially of the respective shaft toward and away from the corresponding first flange), an endless flexible torque transmitting device (preferably a link chain or the like) which is trained over the two pulleys, means for supplying torque to the shaft of the first pulley, means for receiving torque from the shaft of the second pulley, a cylinder and piston unit which is operable to move the second flange of one of the pulleys as a function of the speed ratio and of the magnitude of the torque being transmitted by the transmission, and means for operating the cylinder and piston unit. The operating means comprises a source of pressurized hydraulic fluid (such source can include a sump or another suitable reservoir and a pump which draws fluid from the sump and supplies pressurized fluid to one or more conduits), a fluid-operated torque sensor including rolling elements arranged to apply to the flanges of the one pulley the entire torque to be transmitted by the transmission, and means for supplying fluid to the at least one unit. Such supplying means comprises at least one adjustable regulating valve, and the torque sensor comprises rolling elements and components having faces which define for the rolling elements paths for movement to adjust the at least one pressure regulating valve in response to changes of the torque being supplied to the shaft of the first pulley.

The rolling elements can be, and normally are, spheres.

The at least one pressure regulating valve can include one or more ports provided in the shaft of the one pulley, and a valving element forming part of the piston of the aforementioned cylinder and piston unit and being movable axially of the shaft of the one pulley to thereby vary the rate of fluid flow between a plenum chamber which is defined by the cylinder and piston unit and the one or more ports in the periphery of the shaft forming part of the respective pulley. The valving element of the piston can comprise a sleeve-like portion which sealingly or substantially sealingly engages the peripheral surface of the respective shaft and is movable axially of such shaft to a plurality of axial positions in each of which it overlies the port or ports to a different extent. The port or ports communicates or communicate with one or more channels in the shaft of the respective pulley.

The novel features which are considered as characteristic of the invention are set forth in particular in the appended claims. The improved continuously variable transmission itself, however, both as to its construction and the modes of assembling, installing and operating the same, together with numerous additional important and advantageous features and attributes thereof, will be best understood upon perusal of the following detailed description of certain presently preferred specific embodiments with reference to the accompanying drawings.

DESCRIPTION OF PREFERRED EMBODIMENTS

Figure 1:
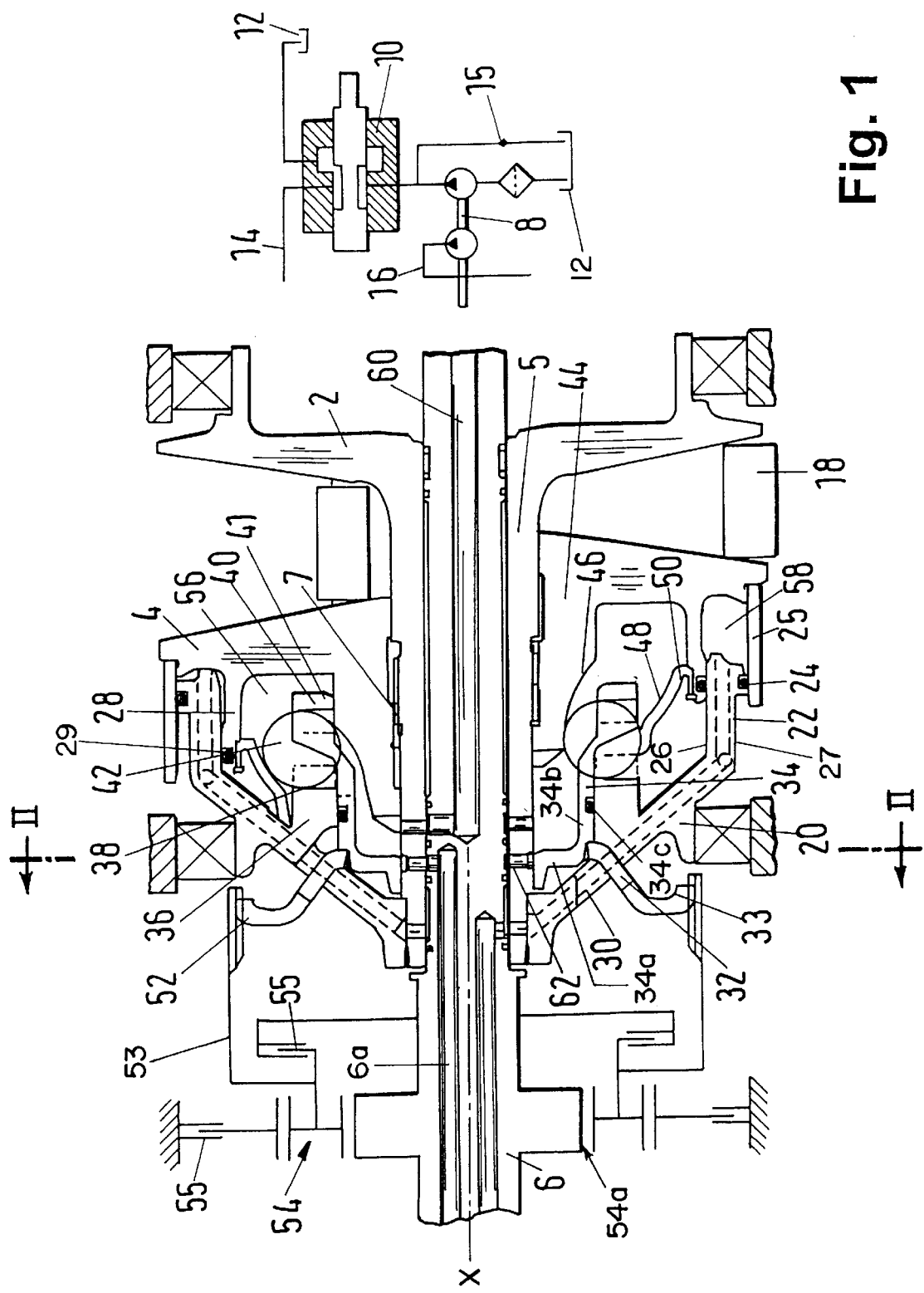
FIG. 1 is a fragmentary partly schematic and partly axial sectional view of a continuously variable transmission which embodies one form of the invention, the axially movable flange of the adjustable pulley which can be seen in FIG. 1 being shown in two different axial positions.

Referring first to FIG. 1, there is shown a portion of a continuously variable transmission (hereinafter called transmission or CVT) including a first adjustable pulley or sheave (hereinafter referred to as pulley) including an axially fixed conical flange 2 and an axially movable conical flange 4. The pulley of FIG. 1 receives torque from a prime mover, such as a combustion engine in the power train of a motor vehicle (see FIG. 1 of the referred-to '915 patent to Friedmann). The engine drives an input shaft (e.g., a camshaft or a crankshaft) 6 which is coaxial with and cannot move axially of a hollow shaft 5. The latter is rigid (e.g., of one piece) with the flange 2, i.e., the flange 2 cannot move axially of the shaft 5 and/or 6.

The flange 4 is movable (within limits) axially of the hollow shaft 5 toward and away from the flange 2 but cannot turn relative to the shafts 5 and 6; to this end, the flange 4 is provided with an internal gear 7 meshing with an external gear of the shaft 5. The external gear of the shaft 5 can comprise one or more splines (teeth) which are parallel to the common axis of the shafts 5 and 6.

An endless flexible torque transmitting device (e.g., an endless belt or chain) 18 is trained over the pulley including the flanges 2, 4 and the shaft 5, as well as over a second (driven) pulley corresponding to the pulley 2 shown in FIG. 1 of the '915 patent to Friedmann et al. or to the pulley 2 in FIG. 1 of the '730 patent to Friedmann et al. The second pulley can transmit torque to a rotary unit of the power train, e.g., to the differential between the driven axles for the front or rear wheels of a motor vehicle. An output element (such as the aforementioned camshaft or crankshaft) of the combustion engine can drive the shaft 6 by way of a suitable clutch, for example, the starter clutch 18 shown in FIG. 1 of the '448 patent to Friedmann.

The shaft 6 further drives a pump 8 serving to circulate a hydraulic fluid (e.g., oil). The outlet of the pump 8 is connected to a slide valve 10 which is adjustable to cause the fluid to flow to the sump 12 or via conduit 14 to a plenum chamber 56 for the purposes and under circumstances to be fully described hereinafter. Another plenum chamber 58 receives fluid which serves to adjust the axial position of the flange 4 relative to the flange 2 and shaft 5 for the purpose of selecting the magnitude of frictional forces acting between the edge faces of the endless torque transmitting device 18 (hereinafter called chain for short) and the adjacent conical surfaces of the flanges 2 and 4, i.e., of selecting the extent of slip or preventing slip between the chain 18 and the pulley including the flanges 2 and 4.

A pressure regulating (relief valve) 15 operates between the pump 8 and the slide valve 10 to open a path between the outlet of the pump and the sump 12 when the pressure of fluid issuing from the pump exceeds a predetermined maximum permissible value. A further conduit 16 connects the pump 8 with the plenum chamber 58 and with an analogous plenum chamber of the second (driven) pulley which normally receives torque from the pulley including the flanges 2,4 by way of the chain 18.

The chain 18 is located at a minimal radial distance from the axis X of the shaft 5 (see the upper half of FIG. 1) when the speed ratio of the illustrated CVT is at a minimum value, i.e., when the pulley including the flanges 2, 4 and the shaft 5 must complete more than a single revolution in order to rotate the shaft of the non-illustrated second pulley through 360°. The lower half of FIG. 1 shows the chain 18 at a greater (such as maximum) radial distance from the axis of the shaft 5; the chain 18 assumes such position when the speed ratio of the CVT is selected to drive the second pulley at an RPM higher than that of the pulley including the shaft 5 and the flanges 2, 4.

That (free) end portion of the shaft 5 which is remote from the flange 2 is rigidly connected with a hollow essentially conical carrier 20 of several sealing elements in the form of annular seals (to be described hereinafter). The connection between the carrier 20 and the shaft 5 is such that these parts are held against angular and/or axial movement relative to each other. The radially outermost portion 22 of the carrier 20 is a relatively short cylinder, and the cylindrical external surface 27 of such outermost portion 22 carries an annular seal 24 (e.g., a ring which is recessed into an external collar of the portion 22) engaging the cylindrical external surface of a cylindrical extension 25 which is sealingly and rigidly affixed to the radially outermost portion of the axially movable flange 4 and extends in a direction away from the axially fixed flange 2. The cylindrical internal surface 26 of the annular extension or portion 22 sealingly engages a ring-shaped seal 29 which is recessed into a cylindrical external surface of a preferably integral annular portion 28 of the axially movable flange 4.

Figure 2:
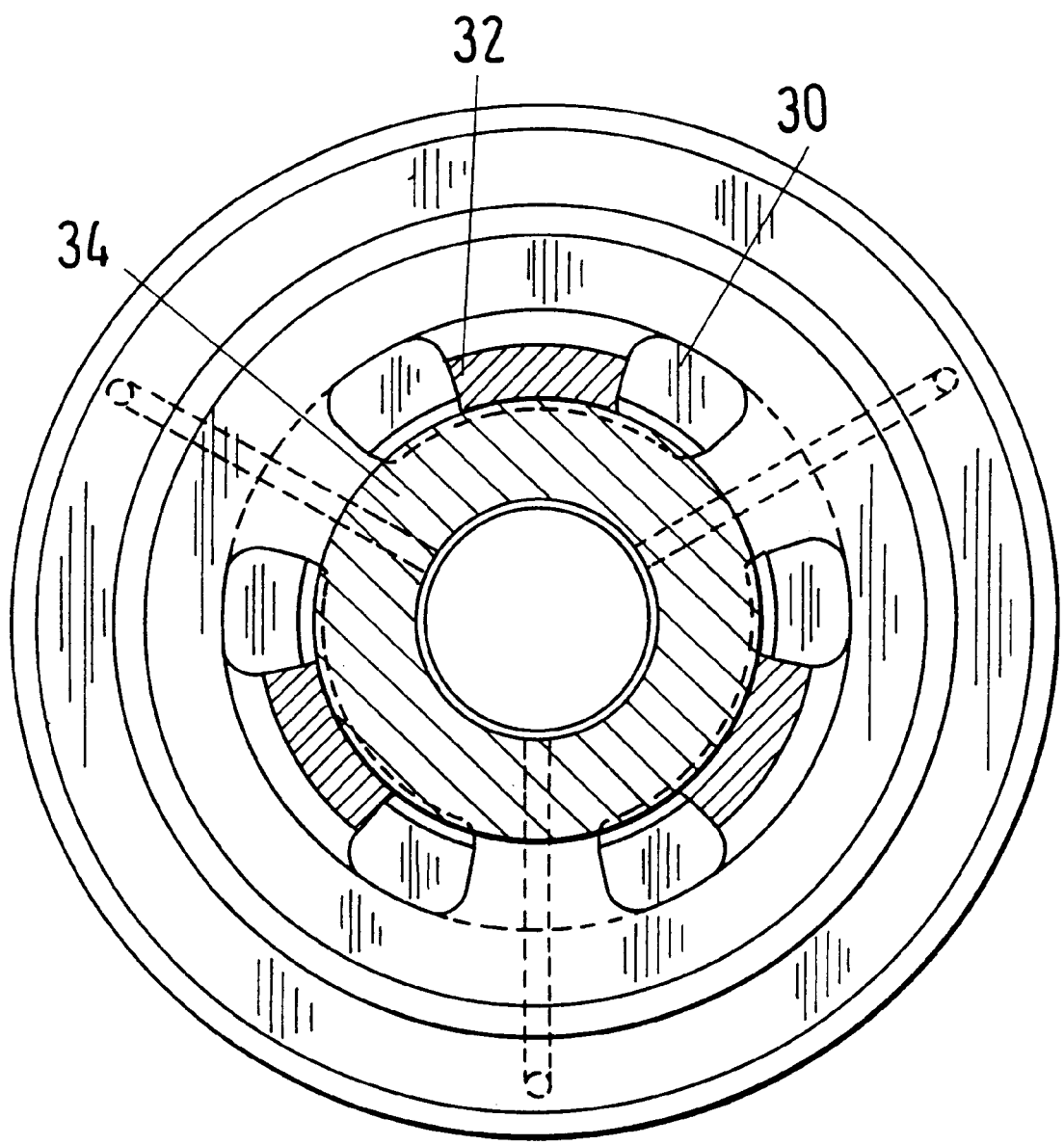
FIG. 2 is a fragmentary sectional view substantially as seen in the direction of arrows from the line II—II in FIG. 1.

The conical major portion of the carrier 20 (namely the portion located between the periphery of the shaft 5 and the radially outermost portion 22) is provided with several circumferentially spaced-apart openings 30 in the form of windows or pockets for portions of arms 32 which are welded or otherwise reliably affixed to an annular piston 34 forming part of a torque sensor which constitutes an important novel constituent of the apparatus shown in FIG. 1. FIG. 2 shows that the illustrated piston 34 is provided with three equidistant arms 32.

The piston 34 resembles a cup having a bottom portion 34a remotest from the flange 2 and sealingly and axially movably surrounding the peripheral surface of the shaft 5. The cylindrical or substantially cylindrical median portion 34b of the piston 34 extends from the bottom portion 34a and has a cylindrical external surface provided with a circumferential recess for a ring-shaped seal 34c slidable along and sealingly engaging the cylindrical internal surface of an annular extension 36 of the conical portion of the carrier 20. The extension 36 is spaced apart from the shaft 5 and from the cylindrical radially outermost portion 22 of the carrier 20 (as seen radially of the axis X). The cylindrical right-hand end face or surface 38 of the extension 36 serves to entrain a set of normally spherical rolling elements 42 (which form part of the torque sensor) when the carrier 20 is caused to move in a direction to the right (as viewed in FIG. 1), namely toward the axially fixed flange 2. The cam face 38 extends radially or substantially radially of the axis X and confronts an annular cam face 40 provided on a suitably bent part 41 of the radially outwardly extending radially outermost right-hand end portion of the piston 34. The part 41 extends radially outwardly from the cylindrical intermediate portion 34b of the piston 34.

The cam faces 38 and 40 determine the axial positions of the rolling elements 42 which, in turn, determine the axial positions of the piston 34.

The radially outer end portions of the sheet metal arms 32 are connected with an annular member 33 (hereinafter called gear) having external teeth 52 which are parallel to the axis X and mate with the internal teeth of a sleeve 53 forming part of a gearing 54. The external teeth 52 enable the arms 32 (and hence the piston 34) to move axially of the sleeve 53 but the latter can transmit torque to the piston 34.

The gearing 54 receives torque from the engine-driven shaft 6 by way of mating gears 54a; this gearing cooperates with two engageable and disengageable clutches 55 and 55'. The pulley including the flanges 2, 4 and the shaft 5 can be rotated clockwise in response to engagement of one of the clutches 55, 55' and counterclockwise in response to engagement of the other of these clutches.

The space between the carrier 20 and the sloping radially outwardly extending portion of the flange 4 (between the sleeve-like extension 44 and the cylindrical extension 25) accommodates the annular plenum chambers 56 and 58. The chamber 56 is located radially inwardly of the chamber 58 and receives the balls 42. The chamber 58 is bounded by the sleeve-like extension 44 and by the annular member 25 of the flange 4 on the one hand, and by the radially outer portion 22 of the carrier 20 on the other hand. The fluid in the chamber 56 serves to bias the conical surface of the flange 4 against the adjacent edge face of the chain 18 (and to thus urge the other edge face of the chain 18 against the conical surface of the axially fixed flange 2). The fluid in the plenum chamber 58 serves to change the speed ratio of the CVT.

The carrier 20 has bores which communicate with an axial blind bore 6a of the shaft 6 and the plenum chamber 58. The bore 6a receives pressurized hydraulic fluid from the valve 10 by way of the aforementioned conduit 14. The plenum chamber 56 receives pressurized hydraulic fluid from the conduit 16 by way of an axial blind bore 60 and one or more radial bore or ports in the shaft 6. At least one radial bore or port 62 of the shaft 5 is provided radially inwardly of the extension 36 of the carrier 20 and serves to permit fluid to escape from the plenum chamber 56 at a rate determined by the axial position of the bottom portion 34a of the piston 34. Thus, the portion 34a and that part of the shaft 5 which defines the port(s) 62 can be said to constitute a regulating valve which determines the rate of flow of hydraulic fluid from the plenum chamber 56.

The mode of operation of the torque sensor including the carrier 20, the piston 34 in the plenum chamber 56 and the balls 42 in the plenum chamber 56 is as follows: If the shaft 6 transmits a relatively small torque so that the arms 32 transmit a small torque to the piston 34 of the torque sensor, the piston 34 assumes the left-hand end position of FIG. 1; in such position of the piston 34, the port or ports 62 permit hydraulic fluid to flow from the plenum chamber 56 by way of the corresponding axial or axially parallel bore(s) 6a in the shaft 6. In other words, the pressure in the chamber 56 is low.

If the magnitude of applied torque increases, the piston 34 exhibits the tendency to turn relative to the flange 4 and the sheet metal member 50 so that the balls 42 roll along the cam faces 38, 40 and initiate a movement of the piston 34 in a direction toward the axially fixed flange 2. Thus, the port or ports 62 are sealed to a progressively increasing extent, i.e., the pressure of fluid in the plenum chamber 56 increases.

If the torque being transmitted to the shaft 6 is constant and the operator of the motor vehicle desires to change the speed ratio of the CVT, the pressure of fluid in the plenum chamber 58 is increased so that the chain 18 (and more specifically that portion of the chain 18 which is trained over the pulley including the flanges 2, 4) travels radially of and away from the axis X toward the position shown in the lower half of FIG. 1, e.g., at a maximum radial distance from the axis X. This enables the guide surfaces 46, 48 to cause the balls 42 to move radially inwardly with a resulting change of slope, as seen in the circumferential direction of the radially outer portion 22 of the carrier 20, and hence a drop of fluid pressure in the chamber 56.

The openings 30 of the carrier 20 can be configured and dimensioned in such a way that the surfaces bounding these openings constitute abutments for the arms 32 to thus limit the movability of the piston 34 and the carrier 20 relative to each other (as seen in a circumferential direction of the shaft 5).

The right-hand end of the cylindrical radially outer portion 22 of the carrier 20 serves as an abutment for the axially movable flange 4, i.e., it determines the extent of leftward movement of the flange 4 and hence the extent of radially inward movement of the chain 18 toward the axis X in the space between the confronting conical surfaces of the flanges 2 and 4.

Figure 3:
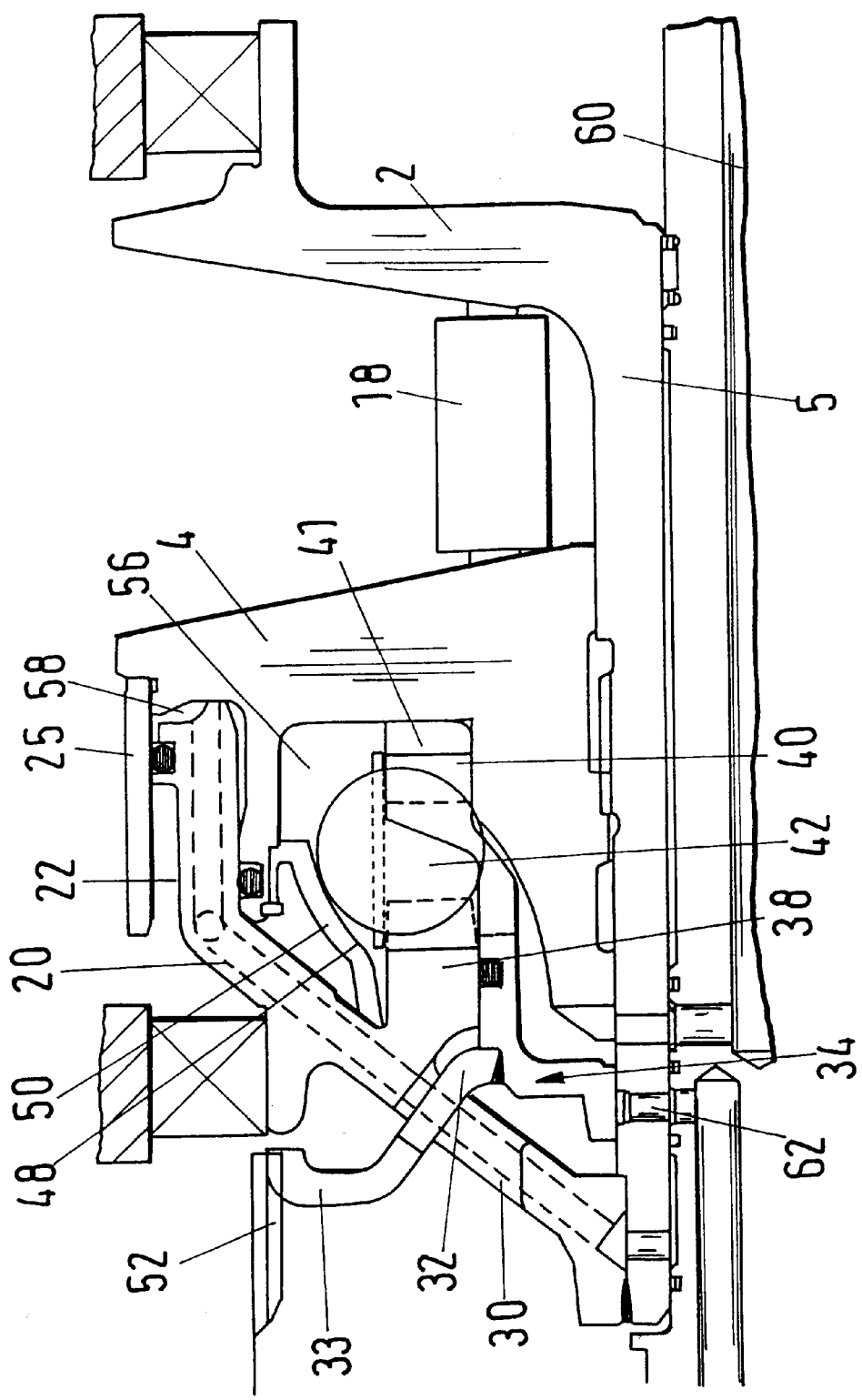
FIG. 3 is an enlarged view of a detail in FIG. 1, with the piston of the torque sensor in an axial position other than those shown in FIG. 1.

FIG. 3 illustrates the upper portion of the pulley of FIG. 1 in that condition of the CVT when the blind bore 60 and hence the plenum chamber 56 do not receive an adequate quantity of hydraulic fluid. Moreover, the openings 30 in the carrier 20 are dimensioned and configured in such a way that they do not limit the extent of rightward movement of the arms 32 and hence of the piston 34. If the fluid in the chambers 56, 58 is not pressurized and the piston 34 of the torque sensor receives torque by way of the gear 33, the various relevant surfaces and faces cause the piston 34 to tend to move in a direction to the right. The configurations of the controlling sides, surfaces and parts are such that the front side of the bent part 41 of the piston 34 (the rear side of this extension is constituted by the entraining surface 40) comes into actual abutment with the axially movable flange 4 (see FIG. 3). This ensures that the flange 4 is mechanically urged against the adjacent edge face of the chain 18. Such mode of operation of the torque sensor is of particular advantage in a CVT wherein a clutch is provided at the output side because, when the engine is started, the transmission is necessarily accelerated with the shaft 6. Such acceleration necessitates the exertion of mechanically induced forces (acting between the edge faces of the chain 18 and the adjacent flanges 2, 4 of the pulley) because the pressure of hydraulic fluid at such stage of operation is not very high in view of the (then) rather negligible displacement of fluid by the pump 8.

An important advantage of the improved transmission is its compactness. This is attributable to the relatively small number of parts which constitute and cooperate with the torque sensor. Furthermore, the torque sensor is integrated into the transmission and is actually confined in the plenum chamber 56. The balls 42 are positively confined to movements along predetermined paths; this contributes to reliability of operation of the torque sensor and of the entire transmission. Still further, predictable and reliable guidance of the piston 34 and of the balls 42 contributes to a reduction of leakage of hydraulic fluid. The feature that the gear 33 is not located in the chamber 56 renders it possible to employ a gear having a large effective diameter which entails a reduction of frictional forces during axial shifting of the parts.

To recapitulate: An important feature of the invention resides in the provision of a CVT with an integrated torque sensor (including the parts 20, 34 and 42) and two pulleys each having an axially fixed first rotary flange (see the flange 2) and a second rotary flange (see the flange 4) which is movable axially of the shaft (such as 5) for the fixed flange. The means for transmitting torque between the two pulleys includes an endless flexible device (such as the chain 18). The torque sensor serves to influence the pressure of fluid in the plenum chamber (56) which is adjacent the axially movable flange (4) of one of the pulleys, and such torque sensor comprises rolling elements (note the balls 42) which are confined to movements along predetermined paths (radially of the axis X and/or in the direction of such axis) by suitably configured cam faces 38, 40 and/or guide surfaces 46, 48. This causes the rolling elements 42 to transmit to the flanges 2, 4 of the respective pulley a torque as a result of axial movements of the components 20, 34 of the torque sensor relative to each other.

In accordance with the present invention, the rolling elements 42 and at least the cam faces 38, 40 of the components 20, 34 of the improved torque sensor are located in the plenum chamber 56. This enhances the compactness, the simplicity and certain other desirable attributes of the improved transmission. The force with which the flanges (such as 2, 4) of a pulley bear upon the adjacent edge faces of the chain 18 dependsupon the magnitude of the torque being transmitted by the transmission as well as upon the speed ratio of the transmission.

It will be appreciated that the improved transmission is susceptible of numerous additional modifications without departing from the spirit of the invention. For example, the torque sensor can be combined with or incorporated or integrated into the driven pulley (i.e., into a pulley which receives torque from the chain 18), and the annular member 50 can be rotatably mounted on the flange 4 (FIG. 1 and/or FIG. 3 is intended to be interpreted in such a way that the member 50 is rotatable relative to the flange 4). Furthermore, certain parts of the improved CVT can be made by casting, by forging or by resorting to any other suitable technique. Still further, the various channels, bores, ports and/or other fluid flow selecting, diverting and/or regulating means may but need not extend radially and/or axially of the respective shaft, pulley or the like.

As already mentioned hereinbefore, and as shown in the drawings, the piston 34 of the torque sensor in the plenum chamber 56 has an annular surface which extends (as seen radially of the axis X) all the way between the peripheral surface of the shaft 5 and the external surface of the extension 36 of the carrier 20, and such annular surface is acted upon by hydraulic fluid in the plenum chamber. The radially inner portion of the bottom part 34a of the piston 34 sealingly but axially movably engages the peripheral surface of the shaft 5, and the radially outer portion (34b) of this piston sealingly engages (at 34c) the extension 36 of the carrier 20.

The piston 34 constitutes that (first) component or constituent of the torque sensor which defines the cam face 40, and the carrier 20 constitutes that (second) component or constituent of the torque sensor which defines the cam face 38.

The force acting between the flanges 2, 4 of the illustrated pulley and the endless torque transmitting chain 18 can be selected by adjusting the pulley, namely by moving the flange 4 relative to the flange 2 in the axial direction of the shaft 5. Such adjustment is carried out in dependency upon the magnitude of the torque being transmitted by the improved CVT and involves an appropriate selection of fluid pressure in the plenum chamber 56. The same holds true for the (non-illustrated) other pulley of the CVT.

The rolling elements 42 of the torque sensor cooperate with the cam faces 38, 40 to generate forces which vary in dependency upon the variations of transmitted torque and upon the momentary speed ratio. The illustrated cam faces 38, 40 are oriented and configured to effect a movement of the rolling elements 42 of the torque sensor at least substantially radially outwardly or inwardly of the axis x in response to changes of the transmission speed ratio. As already mentioned hereinbefore, the shaft 5 can receive torque from the shaft 6 (i.e., from the engine of a motor vehicle), and the shaft of the non-illustrated second pulley of the CVT including the structure of FIGS. 1 to 3 can be utilized to transmit torque to a differential or the like.

In accordance with a further modification, the cam faces 38, 40 can be configured in such a way that changes in the magnitude of the torque being transmitted by the improved CVT cause the rolling elements 42 to carry out movements having components radially of the axis X as well as in the direction of such axis.

The cam faces 38, 40 can be provided on ramps which form part of the torque sensor and constitute portions of the carrier 20 and piston 34. The cam faces of such ramps can be oriented to provide for the rolling elements paths which are inclined relative to the axis X in the direction of movement of the rolling elements in response to changes of the transmission speed ratio.

In accordance with another modification, the rolling elements can include at least two spheres and the components of the torque sensor define for the spheres two confronting grooves each having a substantially V-shaped configuration (as seen in a direction radially of the axis x). These components have contact surfaces which bound the grooves and are disposed substantially diametrically opposite each other. Each sphere is guided by a pair of contact surfaces which are at least substantially parallel to each other and are tangential to the respective sphere, at least at a given radial distance (or within a range of radial distances) from the axis X.

The configuration of the cam faces for the rolling elements can be such that, during transmission of varying torque by the torque sensor, the faces and/or surfaces serving to guide and confine the rolling elements have a configuration (as seen radially of the axis X) such that torque being transmitted by the sensor causes the application to the rolling elements of a force which has a component acting in the radial direction of the axis X.

It is also possible to employ an axially movable flange (e.g., as a substitute for the flange 4) which is provided with cam faces and/or guide surfaces serving to ensure that the rolling elements 42 (or analogous rolling elements) are compelled to move radially of the axis of the respective pulley in response to axial displacement of the axially movable flange.

Alternatively, the cam faces and/or guide surfaces of the axially movable flange can be oriented and configurated in such a way that they compel the rolling elements to move axially of the pulley in response to axial displacement of such flange.

One guide face (46) can be provided on the sleeve-like extension 44 of the flange 4, and the other guide face (48) can be provided on the annular member 50 which is preferably (but not necessarily) rigid with the flange 4.

The arms 32 are or can be made of sheet metal and can be welded or otherwise reliably affixed to the piston 34.

As already mentioned above, the effective annular surface of the piston 34 (as far as the application of fluid pressure thereto is concerned) can extend radially of the axis X all the way from the peripheral surface of the shaft 5 to the internal surface of the extension 36 forming part of the carrier 20. The piston 34 can be in sealing engagement with the peripheral surface of the shaft 5 and/or with the extension 36, either directly or with the interposition of one or more sealing elements in the form of O-rings or others.

The carrier 20 and the axially movable flange 4 can be said to constitute the cylinder of a composite pistoncylinder assembly or unit which confines the piston 34 to movements in the plenum chamber 56 in the direction of the axis X. The means for moving the piston 34 relative to the cylinder and/or vice versa comprises the fluid in the plenum chamber 56 within the cylinder 20, 4 and/or the rolling elements 42. The just discussed piston-cylinder unit can be said to constitute or to form part of the torque sensor. The pressure of fluid in the chamber or chambers of the piston-cylinder unit is a function of the torque being transmitted to the second pulley and/or a function of the selected transmission speed ratio.

The axially movable flange 4 can serve as a means for guiding the rolling elements 42 for movements at least substantially radially of the axis X. The confinement of the rolling elements in cages, which are then movable along preselected paths radially and/or axially of the flange 4, constitutes an optional feature of the invention.

During their movement at least substantially radially of the axis X, the rolling elements 42 can be guided by a conical surface on the flange 4 and/or on a part which shares the axial movements of the flange 4 toward or away from the other flange 2. Such conical surface can taper toward the axis X in a direction away from the flange 2, i.e., its diameter can increase toward this flange.

Without further analysis, the foregoing will so fully reveal the gist of the present invention that others can, by applying current knowledge, readily adapt it for various applications without limiting features that, from the standpoint of the prior art, fairly constitute essential characteristics of the generic and specific aspects of the above outlined contribution to the art of continuously variable speed transmissions and, therefore, such adaptations should and are intended to be comprehended within the meaning and range of equivalence of the appended claims.

What is claimed is:

1. Apparatus for transmitting variable torque, comprising:
a shaft rotatable about a predetermined axis;
a pulley including a first flange affixed to said shaft and a second flange rotatable with said shaft and movable in the direction of said axis toward and away from said first flange;
an endless flexible torque transmitting device trained over said pulley;
a fluid-containing plenum chamber at said second flange; and
a torque sensor arranged to vary the pressure of fluid in said chamber in dependency upon the magnitude of torque being transmitted by the apparatus, said sensor comprising first and second components having confronting cam faces and rolling elements disposed between said cam faces and arranged to transmit torque being applied to said flanges, at least one of said components being movable relative to the other of said components in response to changes in the magnitude of transmitted torque, said rolling elements and said cam faces being disposed in said chamber.

2. The apparatus of claim 1, wherein said torque sensor is integrated into said pulley and said cam faces are configurated to effect a movement of said at least one component relative to said other component in response to rolling of said elements along at least one of said cam faces.

3. The apparatus of claim 1, wherein said rolling elements are spheres and said cam faces extend in at least one of the directions including axially of said shaft and radially of said axis.

4. The apparatus of claim 1, wherein said second flange has first and second guide surfaces confining said rolling elements to movements radially of said axis in response to movements of said second flange in the direction of said axis.

5. The apparatus of claim 1, wherein said second flange has first and second guide surfaces confining said rolling elements to movements in the direction of said axis in response to movements of said second flange axially of said shaft.

6. The apparatus of claim 1, wherein said second flange comprises an annular portion having an external guide surface and extending in the direction of said axis away from said first flange, and further comprising an annular member having an internal guide surface surrounding said external guide surface, said guide surfaces flanking said rolling elements and said annular member being carried by said second flange.

7. The apparatus of claim 6, wherein said annular member consists at least in part of a metallic sheet material.

8. The apparatus of claim 6, wherein said annular member is rigidly connected with said second flange.

9. The apparatus of claim 6, wherein said annular member is rotatable relative to said second flange.

10. The apparatus of claim 6, wherein said rolling elements are spheres and said cam faces extend in at least one of the directions including axially of said shaft and radially of said axis.

11. The apparatus of claim 1, wherein said other component includes a carrier rigidly affixed to said shaft and having a cylindrical external surface in sealing engagement with an annular member of said second flange, said shaft and said carrier bounding at least a portion of said chamber and said at least one component comprising an annular piston movable in said chamber in the direction of said axis and being in sealing engagement with a cylindrical internal surface of said carrier.

12. The apparatus of claim 11, further comprising a first seal between said carrier and said annular member at said cylindrical external surface and a second seal between said carrier and said piston at said cylindrical internal surface of said carrier.

13. The apparatus of claim 11, wherein said shaft and said piston define a valve arranged to regulate the flow of fluid from said chamber as a function of the axial position of said piston in relation to said shaft.

14. The apparatus of claim 13, wherein said piston is arranged to take up an input torque of the apparatus and said valve includes at least one outlet port provided in said shaft and communicating with said chamber in at least one axial position of said piston relative to said shaft.

15. The apparatus of claim 11, wherein said piston comprises arms spaced apart from each other in a circumferential direction of said shaft and extending from said chamber substantially radially outwardly and away from said axis through openings provided therefor in said carrier, and further comprising a gear having internal teeth mating with complementary external teeth of said arms, said gear being arranged to transmit torque to said piston and said piston being movable relative to said gear axially of said shaft.

16. The apparatus of claim 15, wherein said openings are dimensioned to limit the extent of angular movability of said piston and said carrier relative to each other.

17. The apparatus of claim 15, wherein said arms contain a metallic sheet material and are welded to said piston.

18. The apparatus of claim 15, wherein said arms and said gear contain a metallic sheet material.

19. The apparatus of claim 11, wherein said carrier comprises means for limiting the extent of movability of said piston relative to said shaft in the direction of said axis.

20. The apparatus of claim 11, wherein said piston has an annular surface which is acted upon by the fluid in said chamber and extends between said shaft and said carrier as seen radially of said axis.

21. The apparatus of claim 20, wherein said piston has a radially inner portion sealingly engaging said shaft and a radially outer portion sealingly engaging said carrier.

22. The apparatus of claim 1, wherein said first component comprises a piston installed in said chamber and axially movably surrounding said shaft, said piston being movable axially of said shaft against said second flange in response to the application to the apparatus of an input torque in the absence of pressurized fluid in said chamber.

23. A variable-torque, variable speed ration transmission, comprising:
    first and second adjustable rotary pulleys each having coaxial first and second flanges;
    fluid-containing chambers at said second flanges of said pulleys operable to move the second flange of one of said pulleys as a function of a fluidpressure in said chamber;
    an endless flexible torque transmitting device trained over said pulleys and in force-transmitting engagement with said flanges; and
    means for adjusting at least one of said pulleys to select the magnitude of forces acting between the flanges of said at least one pulley and said device as a function of the magnitude of transmitted torque, including a torque sensor having rolling elements and cam faces cooperating with said rolling elements to generate forces varying in dependency upon variations of transmitted torque and upon variations of the speed ratio, said faces being configured and oriented to effect a movement of said rolling elements at least substantially radially of the axis of said at least one pulley in response to changes of the speed ratio.

24. The transmission of claim 23, further comprising means for transmitting torque to said first pulley and means for receiving torque from said second pulley.

25. The transmission of claim 23, wherein said rolling elements are spheres.

26. The transmission of claim 23, wherein said faces are configurated to effect a movement of said rolling elements substantially radially as well as in the direction of the axis of said at least one pulley in response to changes of the speed ratio.

27. The transmission of claim 23, wherein said faces are provided on ramps forming part of said torque sensor and said faces are inclined to provide for said rolling elements predetermined paths the inclination of which relative to the axis of said at least one pulley varies in the direction of movement of said rolling elements in response to changes of the speed ratio.

28. The transmission of claim 23, wherein said rolling elements include at least two spheres and said torque sensor further comprises components defining for said spheres two confronting grooves each having a substantially V-shaped configuration as seen in a direction radially of said axis, said components having contact surfaces bounding said grooves and being disposed at least substantially diametrically opposite each other, each of said spheres being guided by a pair of contact surfaces which are at least substantially parallel to each other and tangential to the respective sphere at least at a given radial distance of said spheres from said axis.

29. The transmission of claim 23, wherein said faces are arranged to transmit to said rolling elements forces each having at least one component acting radially of said axis.

30. The transmission of claim 29, wherein said forces further have additional components acting in the axial direction of said at least one pulley, the magnitude of each at least one component being a relatively small fraction of the magnitude of a second component.

31. The transmission of claim 23, further comprising a prime mover arranged to transmit torque to said at least one pulley.

32. The transmission of claim 23, wherein said first flange of said at least one pulley is an axially fixed flange and the second flange of said at least one pulley is an axially movable flange, said torque sensor further having a piston provided in a fluid-containing plenum chamber adjacent said axially movable flange, said axially movable flange forming part of a cylinder defining said chamber and said piston being movable in said chamber in response to changes of the torque being transmitted by said torque sensor to thus select the magnitude of the force which the fluid in said chamber applies to said axially movable flange for transmission to said endless flexible torque transmitting device.

33. The transmission of claim 23, wherein the flanges of said at least one pulley include an axially fixed and an axially movable flange and said faces are arranged to move said rolling elements substantially radially of and relative to said axially movable flange.

34. The transmission of claim 23, wherein said torque sensor further comprises cages for said rolling elements, said cages being movable along said faces.

35. The transmission of claim 23, wherein one of said faces is provided on an at least partially conical carrier affixed to an axially movable flange of said at least one pulley, said one face being configurated to confine said rolling elements to movements at least substantially radially of the axis of said at least one pulley.

36. The transmission of claim 35, wherein said carrier tapers toward the axis of said at least one pulley in a direction away from said axially movable flange.

37. The transmission of claim 23, wherein each of said pulleys further comprises a rotary shaft, each first flange being rigid with the respective shaft and each second flange being arranged to rotate with and to move axially of the respective shaft.

38. A transmission having a plurality of speed ratios and comprising:

a first adjustable pulley rotatable about a first axis;

a second adjustable pulley rotatable about a second axis, each of said pulleys comprising a shaft defining the respective axis, a first flange rigid with the respective shaft, and a second flange arranged to rotate with and to move axially of the respective shaft toward and away from the corresponding first flange;

an endless flexible torque transmitting device trained over said pulleys;

means for supplying torque to the shaft of said first pulley;

means for receiving torque from the shaft of said second pulley;

a cylinder and piston unit operable to move the second flange of one of said pulleys as a function of the speed ratio and of the magnitude of the torque being transmitted by the transmission;

and means for operating said unit including a source of pressurized fluid, a fluid-operated torque sensor including rolling elements arranged to apply to the flanges of said one pulley the entire torque to be transmitted by the transmission, and means for supplying fluid to said unit including at least one adjustable regulating valve, said torque sensor comprising rolling elements and components having cam faces defining for said rolling elements paths for movement to adjust said at least one pressure regulating valve in response to changes of the torque being supplied to the shaft of said first pulley, said rolling elements and said cam faces being disposed in said cylinder and piston unit.

39. The transmission of claim 38, wherein said rolling elements are spheres.

40. The transmission of claim 38, wherein said at least one pressure regulating valve includes at least one port provided in the shaft of said one pulley and a valving element forming part of the piston of said unit and movable axially of the shaft of said one pulley to thereby vary the rate of fluid flow between a plenum chamber of the cylinder of said unit and said port.

* * * * *